United States Patent
Kashihara et al.

[11] Patent Number: 6,081,054
[45] Date of Patent: Jun. 27, 2000

[54] AUTOMOTIVE ALTERNATOR

[75] Inventors: Toshiaki Kashihara; Yoshihito Asao, both of Tokyo, Japan

[73] Assignee: Mitsubishi Denki Kabushiki Kaisha, Tokyo, Japan

[21] Appl. No.: 09/263,264

[22] Filed: Mar. 5, 1999

[30] Foreign Application Priority Data

Sep. 4, 1998 [JP] Japan .................................. 10-251362

[51] Int. Cl.[7] .................................................. H02K 11/00
[52] U.S. Cl. .............................. 310/68 D; 310/58; 310/64
[58] Field of Search ............................. 310/68 D, 68 R, 310/71, 52, 58, 59, 60 R, 64, 159, 168, 239, 263, 43; 29/596, 597, 598; 363/141, 145

[56] References Cited

U.S. PATENT DOCUMENTS

| | | | |
|---|---|---|---|
| 4,232,238 | 11/1980 | Saito et al. | 310/68 D |
| 4,606,000 | 8/1986 | Steele et al. | 363/145 |
| 5,451,823 | 9/1995 | Deverall et al. | 310/68 D |
| 5,677,616 | 10/1997 | Ooiwa | 322/17 |
| 5,686,780 | 11/1997 | Adachi et al. | 310/68 D |
| 5,729,063 | 3/1998 | Adachi et al. | 310/68 D |
| 5,742,498 | 4/1998 | Taniguchi et al. | 363/145 |

FOREIGN PATENT DOCUMENTS

58-149079  10/1983  Japan .
2091007   1/1982   United Kingdom .

*Primary Examiner*—Nestor Ramirez
*Assistant Examiner*—Tran N Nguyen
*Attorney, Agent, or Firm*—Sughrue, Mion, Zinn, Macpeak & Seas, PLLC

[57] ABSTRACT

An automotive alternator comprises a voltage regulator case molded from insulating resin in which a connector portion, a circuit housing portion for housing a circuit portion of a voltage regulator and a condenser housing portion are integrally formed, in which conductors are insert-molded to form connecting terminals for electric connection to the outside and internal wiring paths, and on which a heat sink for cooling the circuit portion of the voltage regulator is disposed so as to cover an opening of the circuit housing portion, the voltage regulator case being disposed on same plane as a rectifier which intersects the axial center of the shaft at a right angle so as to surround the shaft at one end of the shaft, wherein the connector portion, the circuit housing portion and the condenser housing portion of the voltage regulator case are arranged circumferentially such that the axial direction of the connector portion, the longitudinal direction of cooling fins of the heat sink and the longitudinal direction of the condenser housing portion each point towards the axial center of the shaft.

3 Claims, 7 Drawing Sheets

FIG. 10
PRIOR APT

FIG. 11
PRIOR ART

AUTOMOTIVE ALTERNATOR

BACKGROUND OF THE INVENTION

1. Field of the Invention

The present invention relates to an automotive alternator having centrifugal fans for mounting on an automobile engine, and in particular relates to the construction of a voltage regulator case capable of effectively cooling a voltage regulator.

2. Description of the Related Art

Figure 8:
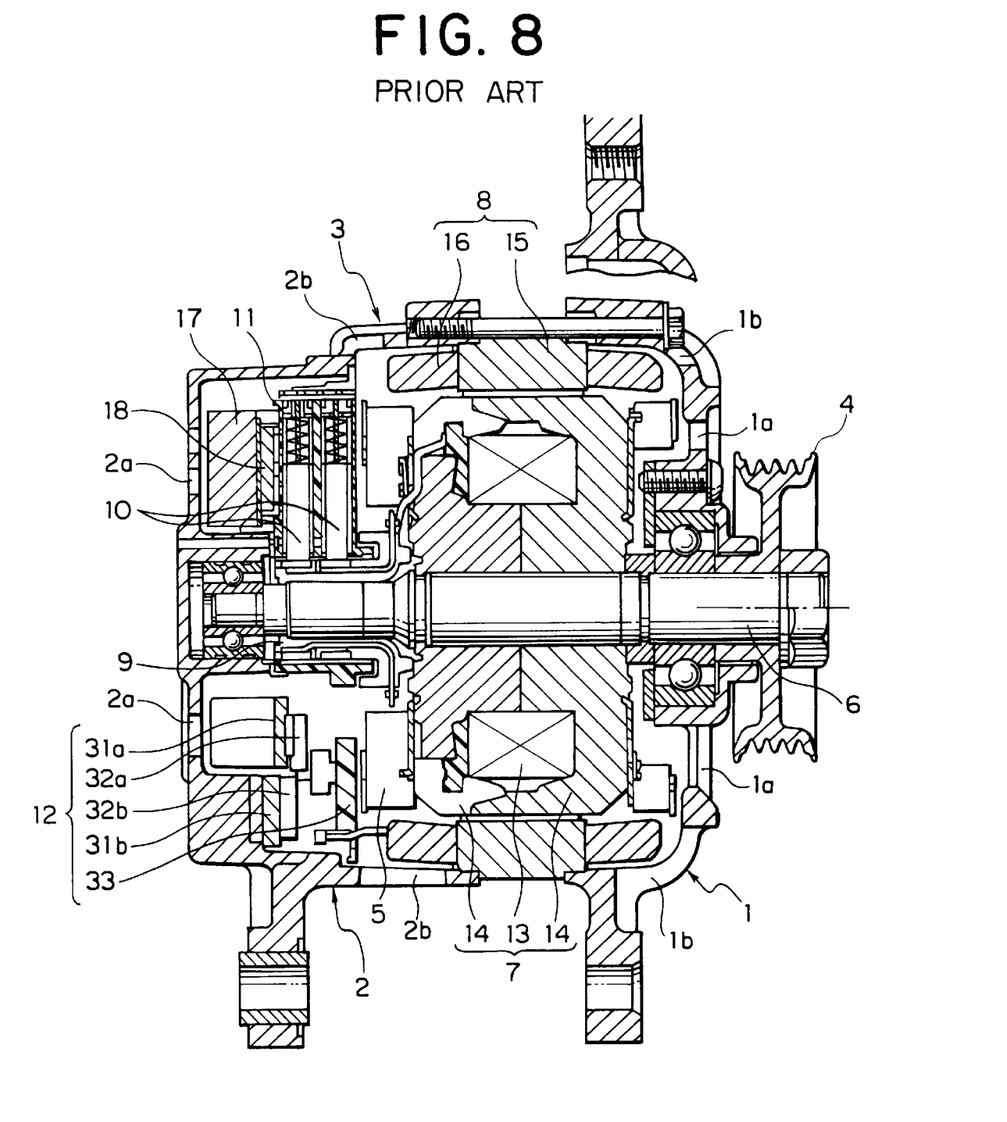
FIG. 8 is a cross-section of a conventional automotive alternator.

FIG. 8 is a cross-section of the construction of a conventional automotive alternator.

Such a conventional automotive alternator comprises: a Lundell-type rotor 7 mounted so as to be freely rotatable by means of a shaft 6 within a case 3 comprising a front bracket 1 and a rear bracket 2 which are made of alminium; and a stator 8 secured to inner wall of the case 3 so as to cover the outer peripery of the rotor 7.

The shaft 6 is rotatably supported by the front bracket 1 and the rear bracket 2. A pulley 4 is secured to one end of the shaft 6 to enable rotational torque from an engine to be transmitted to the shaft 6 by means of a belt (not shown).

Slip rings 9 for supplying electric current to the rotor 7 are secured to the other end of the shaft 6, and a pair of brushes 10 are housed in a brush holder portion 11 disposed within the case 3 so as to slide in contact with the slip rings 9. A voltage regulator 18 for regulating an output voltage of the stator 8 is adhered to a heat sink 17 fitted to the brush holder portion 11. A rectifier 12 electrically connected to the stator 8 for rectifying an alternating current generated in the coil of the stator 8 to a direct current is mounted within the case 3.

The rotor 7 comprises a rotor coil 13 for generating a magnetic flux when an electric current flows therein and a pair of pole cores 14 disposed so as to cover the rotor coil 13 in which magnetic poles are formed by the magnetic flux generated by the rotor coil 13. The pair of pole cores 14 are secured to the shaft 6 facing each other so that claw portions intermesh. In addition, centrifugal fans 5 are secured to both ends of the rotor 7 in the axial direction.

The stator 8 comprises a stator core 15 and a stator coil 16 composed of wires wound around the stator core 15 in which an alternating current is generated by changes in the magnetic flux from the rotor 7 as the rotor 7 rotates.

Figure 9:
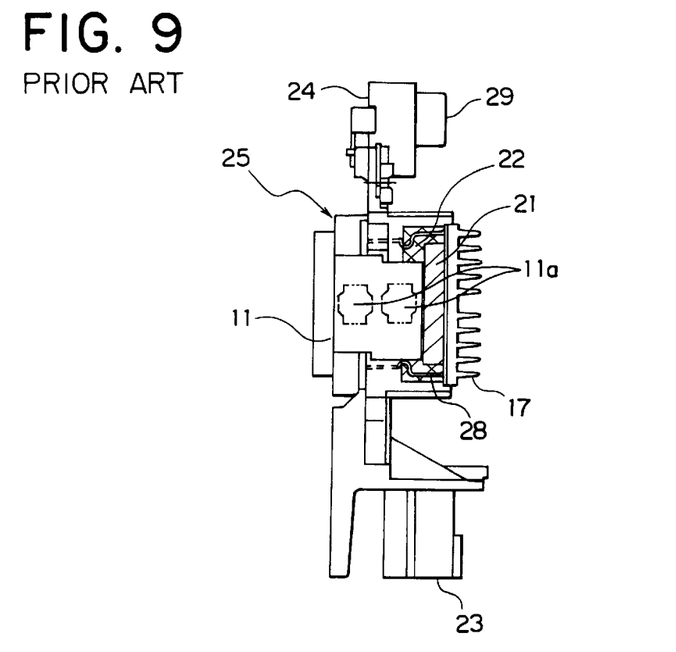
FIG. 9 is a side elevation showing a voltage regulator case fitted with a voltage regulator in the conventional automotive alternator; of FIG. 8.
Figure 10:
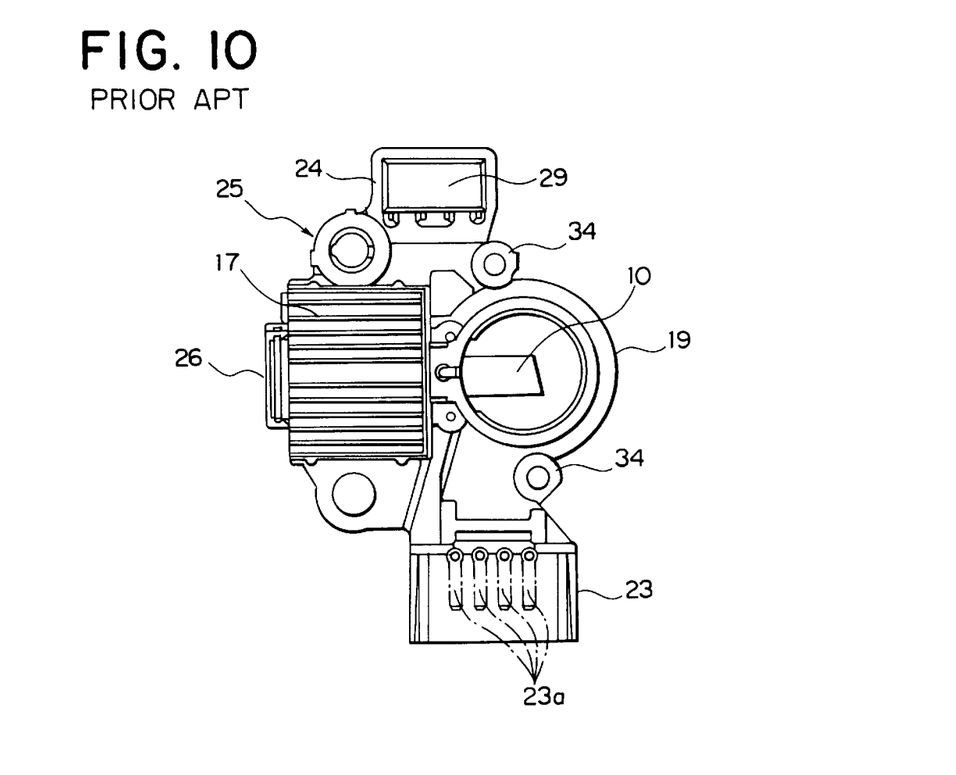
FIG. 10 is a rear elevation showing the voltage regulator case fitted with the voltage regulator in the conventional automotive alternator; of FIG. 8.

Next, the mounted construction of the voltage regulator 18 will be explained with reference to FIGS. 9 and 10.

A voltage regulator case 25 is molded from insulating resin, and the brush holder portion 11, an annular shaft receiving portion 19, a circuit housing portion 22, a connector portion 23 and a condenser housing portion 24 are molded integrally therewith. Inserted conductors are insert-molded into the case 25. The inserted conductors constitute wiring paths between each of the elements mounted in the case 25, as well as projecting into the connector portion 23 to form connecting terminals 23a, and are exposed where necessary to form connecting terminals 34, etc., for electric connection to the rectifier 12.

The brush holder portion 11 is formed in the case 25 so that the shaft receiving portion 19 communicates with peripheral opening portions 11a, and brushes 10 are housed within the brush holder portion 11 such that one end of each of the brushes 10 projects into the shaft receiving portion 19. Moreover, springs (not shown) are disposed within the brush holder portion 11 and push the brushes 10 in the direction of projection. Caps 26 are mounted so as to block the other end of the peripheral opening portions 11a of the brush holder portion 11.

A board 21 mounted with electronic components such as integrated circuits, etc., constituting the voltage regulator 18 is secured by adhesive to the heat sink 17. The heat sink 17 is disposed with the circuit housing portion 22 so as to position the board 21 within the circuit housing portion 22, and a seal is formed between the heat sink 17 and edge portions of the circuit housing portion 22. Thereafter, lead pins 28 soldered to the board 21 are electrically connected to terminals exposed in the case 25, and sealing resin is injected into and hardened in the circuit housing portion 22.

The connecting terminals 23a projecting into the connector portion 23 comprise terminals for detecting battery voltage, terminals for alerting the driver of the vehicle to overvoltage or absence of power generation from the alternator, etc.

The condenser 29 suppresses surges generated as the voltage regulator 18 regulates the voltage, thereby preventing the propagation of noise in audio systems, etc., and is housed in the condenser housing portion 24.

Now, the voltage regulator case 25 is formed in an approximate fan shape centered on the annular shaft receiving portion 19 with the connector portion 23, the circuit housing portion 22, and the condenser housing portion 24 being arranged circumferentially, and the brush holder portion 11 is formed integrally on the front side of the circuit housing portion 22. The longitudinal direction of the cooling fins of the heat sink 17 (the longitudinal direction of the cooling fin located in the center) points towards the center of the shaft receiving portion 19, so that the longitudinal direction of the cooling fins of the heat sink 17 is parallel to the longitudinal direction of the condenser 29 and the longitudinal direction of the cooling fins of the heat sink 17 intersects the direction of projection of the connecting terminals 23a (the axial direction of the connector portion 23) at a right angle.

Figure 11:
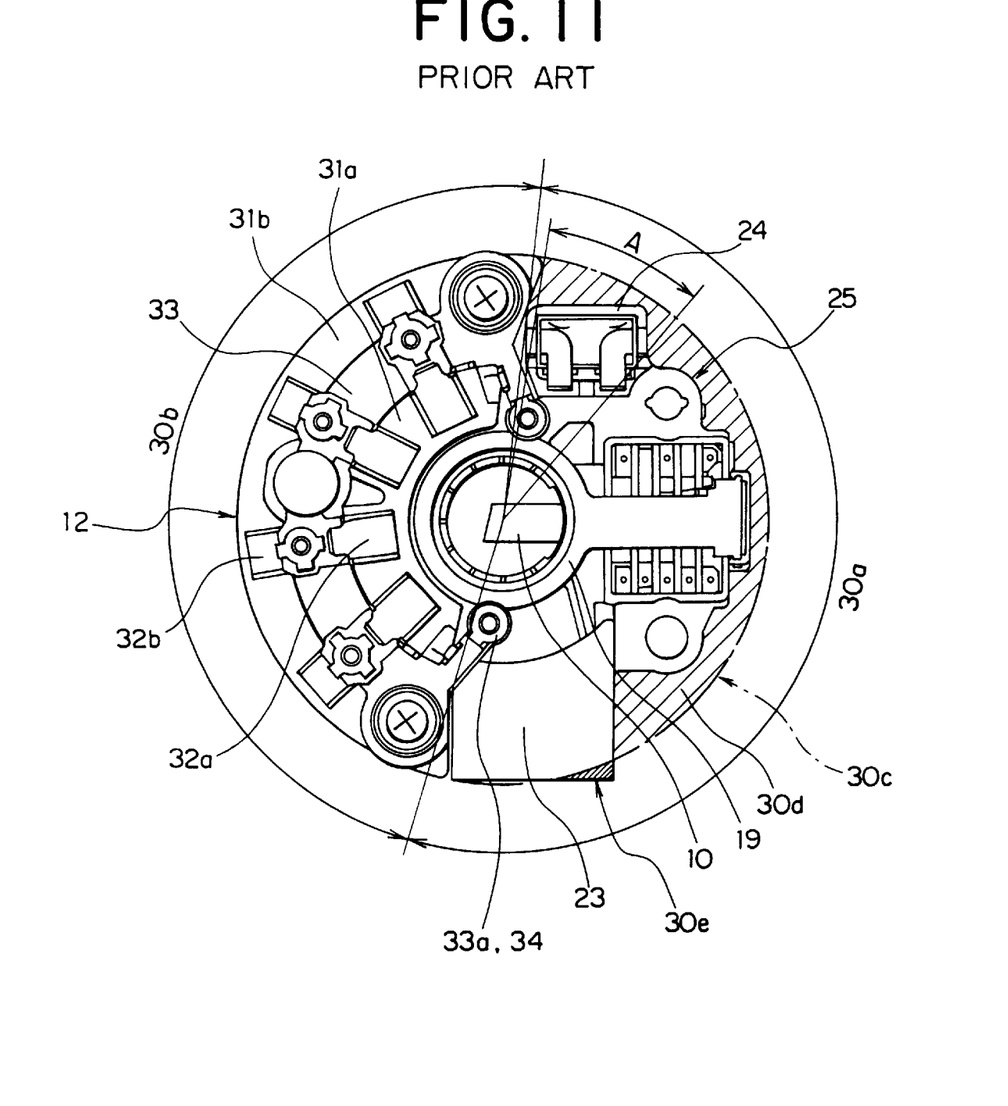
FIG. 11 is a front elevation showing the positional relationship between the voltage regulator case and a rectifier in the conventional automotive alternator of FIG. 8.

As shown in FIG. 11, the voltage regulator case 25 constructed in this manner is assembled by inserting the shaft 6 (not shown) into the shaft receiving portion 19 such that both ends of the voltage regulator case 25 in the circumferential direction fit together with both ends of the rectifier 12 in the circumferential direction. Thus, the voltage regulator case 25 and the rectifier 12 are disposed in a circle so as to surround the shaft 6. The caps 26 are formed such that the outside diameter thereof approximately coincides with the outermost diameter 30c of the centrifugal fans 5 and blocks the unused space portion 30d indicated by oblique lines in FIG. 11, so that the cooling air sucked from intake openings 1a caused by the rotation of the centrifugal fans 5 flows to the inner circumferential side along the surface of the voltage regulator case 25.

Now, the rectifier 12 comprises a pair of arc-shaped heat sinks 31a, 31b each having positive and negative diodes 32a, 32b plurally mounted on the main surface thereof and an arc-shaped circuit board 33 composed of conductors insert-molded into insulating resin. The rectifier 12 is formed in an arc shape by arranging the pair of heat sinks 32a, 32b coaxially with their main surfaces lying approximately in a same plane and arranging the circuit board 33 on the main surfaces of the pair of heat sinks 32a, 32b. The conductors constitute wiring paths between the diodes 32a, 32b, as well as being exposed where necessary to form connecting terminals 33a for electric connection to the connecting terminals 34 of the voltage regulator case 25.

In a conventional automotive alternator constructed in this manner, a current is supplied from a battery (not shown) by means of the brushes 10 and the slip rings 9 to the rotor coil 13, and a magnetic flux is generated. The claw portions of one pole core 14 are magnetized to N polarities by the magnetic flux, and the claw portions of the other pole core 14 are magnetized to S polarities. At the same time, the rotational torque of the engine is transmitted to the shaft 6 by means of the belt and the pulley 4, and the rotor 7 is rotated. Thus, a rotating magnetic field is imparted to the stator coil 16 and electromotive force is generated in the stator coil 16. This alternating electromotive force is rectified to a direct current by means of the rectifier 12, its voltage is regulated by the voltage regulator 18, and the battery is recharged.

The centrifugal fans 5 rotate so that the cooling air is sucked from intake openings 1a, 2a in the front bracket 1 and the rear bracket 2 and discharged to the outside through exhaust openings 1b, 2b. At that time, the cooling air sucked from the intake openings 2a in the rear bracket 2 flows radially inwards along the surface of the cooling fins of the heat sink 17 of the voltage regulator case 25 and the heat sink 31a of the rectifier 12, passes between the shaft 6 and the voltage regulator case 25 and between the shaft 6 and the rectifier 12, and is discharged thereafter through the exhaust openings 2b.

In a conventional automotive alternator constructed in this manner, the longitudinal direction of the condenser 29 is parallel to the longitudinal direction of the cooling fins of the heat sink 17 and the direction of projection of the connecting terminals 23a intersects the longitudinal direction of the cooling fins of the heat sink 17 at a right angle.

Thus, one problem is that the condenser housing portion 24 and the connector portion 23 inhibit the flow of the cooling air caused by the rotation of the centrifugal fans 5 as it moves radially inwards towards the inner circumference, increasing wind resistance to the cooling air flowing along the surface of the cooling fins of the heat sink 17, and therefore the voltage regulator 18 cannot be effectively cooled.

Another problem is that, as shown in FIG. 11, the circumferential angle 30a of the voltage regulator case 25 centered on the axis of the shaft 6 is greater than 180 degrees. In other words, the circumferential angle of the rectifier 12 is less than 180 degrees, making the surface area of the heat sink 31a insufficient for cooling and also making the spaces between the diodes 32a too narrow, and therefore the diodes 32a cannot be effectively cooled.

Yet another problem is that, as shown in FIG. 11, a corner portion 30e of the connector portion 23 projects radially outside the outermost diameter 30c of the centrifugal fans 5, requiring to form a recess portion for housing the corner portion 30e in the rear bracket 2. For that reason, the portion of the rear bracket 2 around the outside of the outermost diameter 30c of the centrifugal fans 5 cannot be formed in a circular shape, reducing mountability onto the automobile.

SUMMARY OF THE INVENTION

The present invention aims to solve the above problems and an object of the present invention is to provide an automotive alternator enabling a voltage regulator to be effectively cooled by reducing wind resistance to the cooling air, enabling diodes to be effectively cooled by reducing the circumferential angle of a voltage regulator case to less than 180 degrees, that is to say, increasing the circumferential angle of a rectifier to 180 degrees or more, and additionally enabling automobile mountability to be improved by enabling the portion of a rear bracket around the outside of the outermost diameter of a centrifugal fans to be formed in a circular shape, by modifying the arrangement of the connector portion and a condenser housing portion of the voltage regulator case.

In order to achieve the above object, according to one aspect of the present invention, there is provided an automotive alternator comprising a shaft supported in a case so as to be able to rotate freely; a rotor disposed in the case and composed of a pair of pole cores each having a plurality of claw portions projecting from outer circumferential edge portions thereof, the pole cores being fixedly fitted over the shaft in an opposed relation to each other so that the claw portions are able to engaged with each other; a stator disposed within the case so as to be positioned around the periphery of the rotor; centrifugal fans secured to both axial ends of the rotor; a rectifier for rectifying an alternating current generated in the stator to a direct current, the rectifier being mounted within the case coaxial to the shaft at one end of the shaft and ob a plane which intersects the axial center of the shaft at a right angle; a voltage regulator for regulating an output voltage of the stator; and a voltage regulator case molded from insulating resin in which a connector portion, a circuit housing portion for housing a circuit portion of the voltage regulator and a condenser housing portion are integrally formed, in which conductors are insert-molded to form connecting terminals for electric connection to the outside and internal wiring paths, and on which a heat sink for cooling the circuit portion of the voltage regulator is disposed so as to cover an opening of the circuit housing portion, the voltage regulator case being disposed on the same plane as the rectifier so as to surround the shaft at one end of the shaft, wherein the connector portion, the circuit housing portion and the condenser housing portion of the voltage regulator case are arranged circumferentially such that the axial direction of the connector portion, the longitudinal direction of cooling fins of the heat sink and the longitudinal direction of the condenser housing portion each point towards the axial center of the shaft.

DETAILED DESCRIPTION OF THE PREFERRED EMBODIMENTS

An embodiment of the present invention will be described hereinbelow with reference to the drawings.

Embodiment 1

Figure 1:
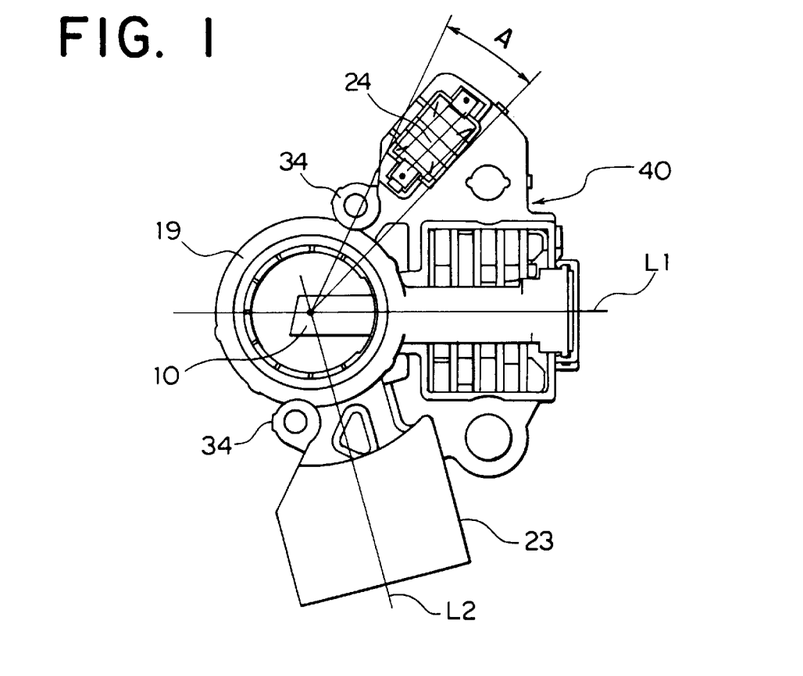
FIG. 1 is a front elevation showing a voltage regulator case fitted with a voltage regulator in an automotive alternator according to Embodiment 1 of the present invention.
Figure 2:
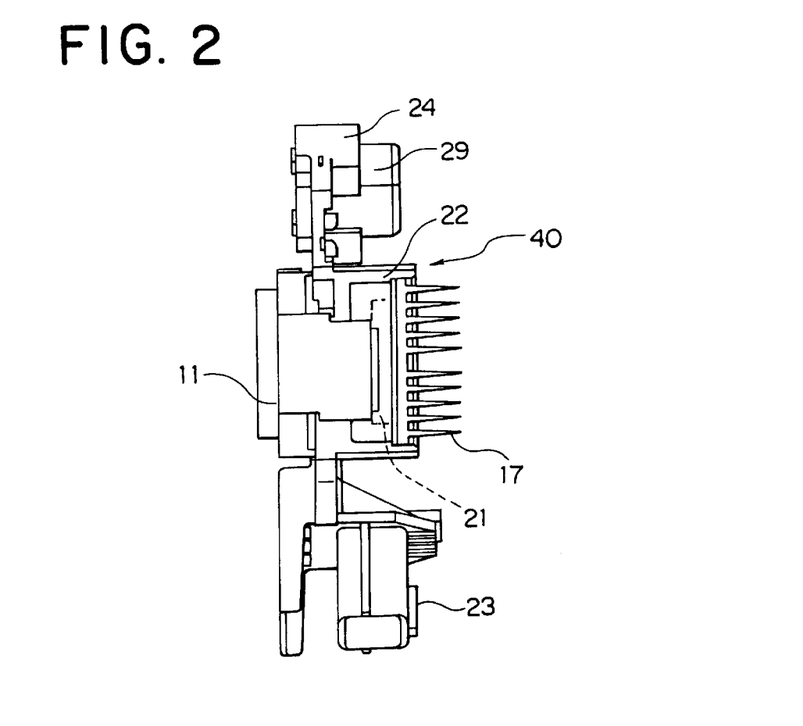
FIG. 2 is a side elevation showing the voltage regulator case fitted with the voltage regulator in the automotive alternator according to Embodiment 1 of the present invention.
Figure 3:
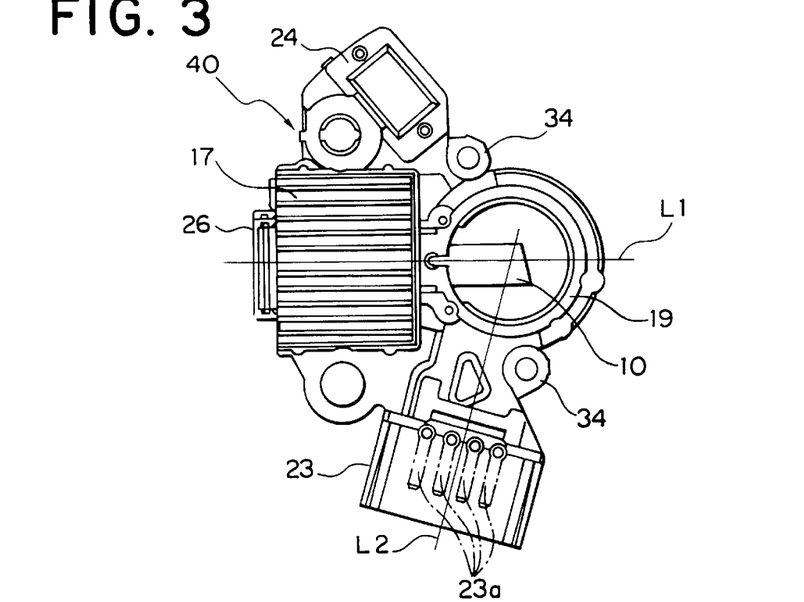
FIG. 3 is a rear elevation showing the voltage regulator case fitted with the voltage regulator in the automotive alternator according to Embodiment 1 of the present invention.

FIG. 1 is a front elevation showing a voltage regulator case fitted with a voltage regulator in an automotive alternator according to Embodiment 1 of the present invention, FIG. 2 is a side elevation showing the voltage regulator case fitted with the voltage regulator in the automotive alternator according to Embodiment 1 of the present invention, and FIG. 3 is a rear elevation showing the voltage regulator case fitted with the voltage regulator in the automotive alternator according to Embodiment 1 of the present invention.

In each of the figures, a voltage regulator case 40 is molded from insulating resin, and a brush holder portion 11, an annular shaft receiving portion 19, a circuit housing portion 22, a connector portion 23, and a condenser housing portion 24 are molded integrally therewith. Conductors are insert-molded into the voltage regulator case 40. The conductors constitute wiring paths between each of the elements mounted in the case 40, as well as projecting into the connector portion 23 to form connecting terminals 23a, and are exposed where necessary to form connecting terminals 34, etc., for electric connection to a rectifier 12.

The brush holder portion 11 is formed in the case 40 so that the shaft receiving portion 19 communicates with peripheral opening portions, and brushes 10 are housed within the brush holder portion 11 such that one end of each of the brushes 10 projects into the shaft receiving portion 19. Moreover, springs (not shown) are disposed within the brush holder portion 11 and push the brushes 10 in the direction of projection. Caps 26 are mounted so as to block the other end of the peripheral opening portions of the brush holder portion 11.

A board 21 mounted with electronic components such as integrated circuits, etc., constituting a voltage regulator 18 is secured with adhesive to a heat sink 17. The heat sink 17 is disposed with the circuit housing portion 22 so as to position the board 21 within the circuit housing portion 22, and a seal is formed between the heat sink 17 and edge portions of the circuit housing portion 22. Thereafter, lead pins soldered to the board 21 are electrically connected to terminals exposed in the case 40, and sealing resin is injected into and hardened in the circuit housing portion 22.

Now, the voltage regulator case 40 is formed in a fan shape centered on the annular shaft receiving portion 19 with the connector portion 23, the circuit housing portion 22, and the condenser housing portion 24 being arranged circumferentially, and the brush holder portion 11 is formed integrally on the front side of the circuit housing portion 22. The longitudinal direction L1 of the cooling fins of the heat sink 17 (the longitudinal direction of the cooling fin located in the center) and the direction of extension L2 of a connecting terminals 23a of the connector portion 23 (the axial direction of the connector portion 23) point towards the center of the shaft receiving portion 19 (the axial center of a shaft 6 (not shown)). In addition, the longitudinal direction of a condenser 29 points generally towards the center of the shaft receiving portion 19.

Figure 4:
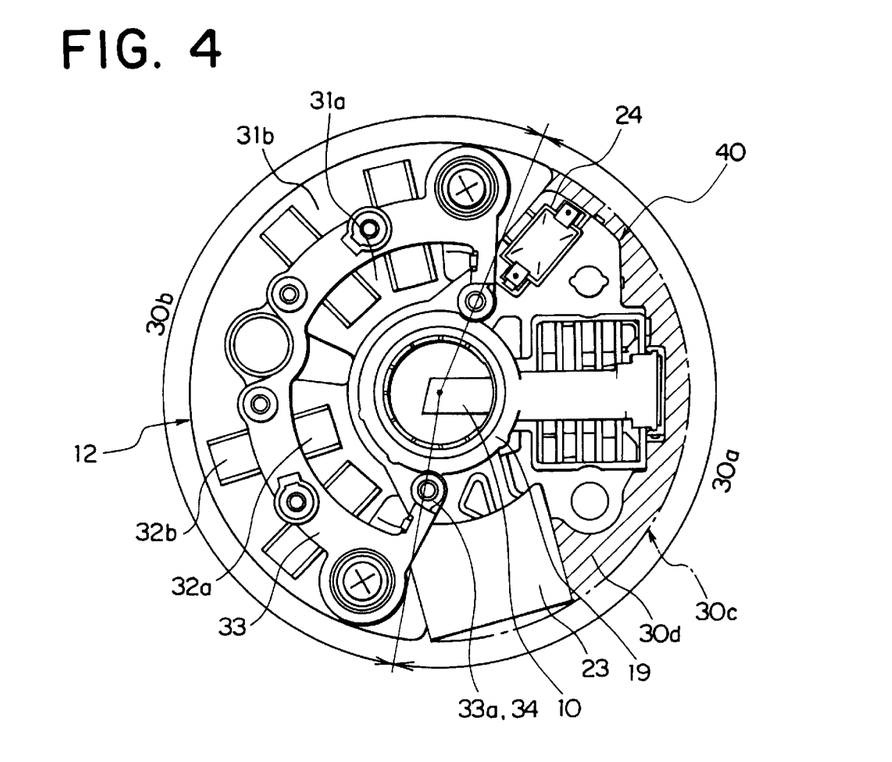
FIG. 4 is a front elevation showing the positional relationship between the voltage regulator case and a rectifier in the automotive alternator according to Embodiment 1 of the present invention.

As shown in FIG. 4, the voltage regulator case 40 constructed in this manner is assembled by inserting the shaft 6 (not shown) into the shaft receiving portion 19 such that both ends of the voltage regulator case 40 in the circumferential direction fit together with both ends of a rectifier 12 in the circumferential direction. Thus, the voltage regulator case 40 and the rectifier 12 are disposed in a circle so as to surround the shaft 6 on the same plane which intersects the axial center of the shaft 6 at a right angle. The caps 26 are formed such that the outside diameter thereof approximately coincides with the outermost diameter 30c of the centrifugal fans 5 and blocks the unused space portion 30d indicated by oblique lines in FIG. 4, so that the cooling air sucked from intake openings 1a caused by the rotation of the centrifugal fans 5 flows to the inner circumferential side along the surface of the voltage regulator case 40.

The rest of the construction is the same as for the conventional automotive alternator shown in FIGS. 8 to 11.

In the automotive alternator according to Embodiment 1, the centrifugal fans 5 rotate so that the cooling air is sucked from the intake openings 1a, 2a in a front bracket 1 and a rear bracket 2 and discharged to the outside through exhaust openings 1b, 2b. At that time, the cooling air sucked from the intake openings 2a in the rear bracket 2 flows radially inwards along the surface of the cooling fins of the heat sink 17 of the voltage regulator case 40 and the heat sink 31a of the rectifier 12, passes between the shaft 6 and the voltage regulator case 40 and between the shaft 6 and the rectifier 12, and is discharged thereafter through the exhaust openings 2b.

Since the longitudinal direction of the condenser 29 in Embodiment 1 is arranged so as to point generally towards the center of the shaft receiving portion 19, the inter-radial angle A defined by the lines pointing to the axial center of the shaft 6 from both sides of the condenser 29 can be reduced compared to the conventional example. In other words, whereas the interradial angle A in the conventional example shown in FIG. 11 was 30 degrees, the inter-radial angle A in Embodiment 1 is 18.5 degrees. Consequently, the condenser housing portion 24 according to Embodiment 1 is arranged in a manner which does not hinder the flow of cooling air caused by the rotation of the centrifugal fans 5 as much as the conventional example, and the cooling air flows along the surface of the cooling fins of the heat sink 17 with little wind resistance, enabling effective cooling of the voltage regulator 18, thus enabling suppression of temperature increases in the voltage regulator 18.

Since the direction of extension L2 of the connecting terminals 23a of the connector portion 23 is arranged so as to point towards the center of the shaft receiving portion 19, the corner portions of the connector portion 23 are housed within the outermost diameter 30c of the centrifugal fans 5, and therefore a recess portion for housing a corner portion of the connector portion 23 does not need to be formed in the rear bracket 2 as it does in the conventional example. Thus, the rear bracket 2 around the outside of the outermost diameter 30c of the centrifugal fans 5 can be formed in a circular shape, improving mountability onto the automobile.

Moreover, since the connector portion 23, the circuit housing portion 22, and the condenser housing portion 24 are arranged circumferentially such that the longitudinal direction L1 of the cooling fins of the heat sink 17 and the direction of extension L2 of the connecting terminals 23a of the connector portion 23 point towards the center of the shaft receiving portion 19, and the longitudinal direction of the condenser 29 points generally towards the center of the shaft receiving portion 19, the connector portion 23, the circuit housing portion 22 and the condenser housing portion 24 can be arranged in close proximity in the circumferential direction. Thus, the circumferential angle 30a of the voltage regulator case 40 centered on the axial center of the shaft 6 can be reduced to less than 180 degrees. That is to say, the circumferential angle of the rectifier 12 can be increased to 180 degrees or more, ensuring that the surface area of the heat sink 31a is sufficient for cooling and also making the spaces between the diodes 32a wider, whereby the diodes 32a can be effectively cooled.

Also, since the circumferential angle of the voltage regulator case 40 can be reduced, the voltage regulator case 40 can be made smaller, reducing material costs.

Furthermore, since both ends of the voltage regulator case 40 in the circumferential direction fit together with both ends of the rectifier 12 in the circumferential direction, the voltage regulator case 40 and the rectifier 12 are disposed on the same plane which intersects the axial center of the shaft 6 at a right angle, the axial dimension of the automotive alternator can be reduced, enabling the size of the automotive alternator to be reduced.

Now, in order to verify the effects of Embodiment 1, an automotive alternator was assembled employing a voltage regulator case 40 with a circumferential angle 30a of 170 degrees and a rectifier 12 with a circumferential angle 30b of 190 degrees and the increase in the temperature of the diodes was measured. A 5° C. reduction in the temperature of the diodes was achieved in the automotive alternator according to Embodiment 1 compared to the temperature of the diodes in a conventional example of an automotive alternator employing a voltage regulator case 25 with a circumferential angle 30a of 190 degrees and a rectifier 12 with a circumferential angle 30b of 170 degrees.

This shows that since the circumferential angle of the rectifier 12 in Embodiment 1 can be increased as much as the circumferential angle of the voltage regulator case 40 can be reduced, sufficient surface area is ensured in the heat sink 31a for cooling and the spaces between the diodes 32a are wider, enabling the diodes 32a to be effectively cooled.

Moreover, in Embodiment 1 above, the unused space portion 30d is blocked by the caps 26 in order to reduce wind noises and increase wind volume, but the unused space portion 30d may be blocked by increasing the thickness of the outer diameter portion of the voltage regulator case 40, or the unused space portion 30d may be blocked by increasing the thickness of the inner diameter portion of the rear bracket 2. In either case, since the unused space portion 30d is reduced by making the voltage regulator case 40 smaller, large increases in thickness are not required, facilitating construction.

Embodiment 1 above was explained with reference to an automotive alternator employing a voltage regulator case 40 having brush holders 11 molded integrally therewith, but it goes without saying that similar effects can be achieved when the technique is applied to an automotive alternator wherein the brush holders 11 are constructed separately from the voltage regulator case 40 or to an automotive alternator having no brushes 10.

Embodiment 2

Figure 5:
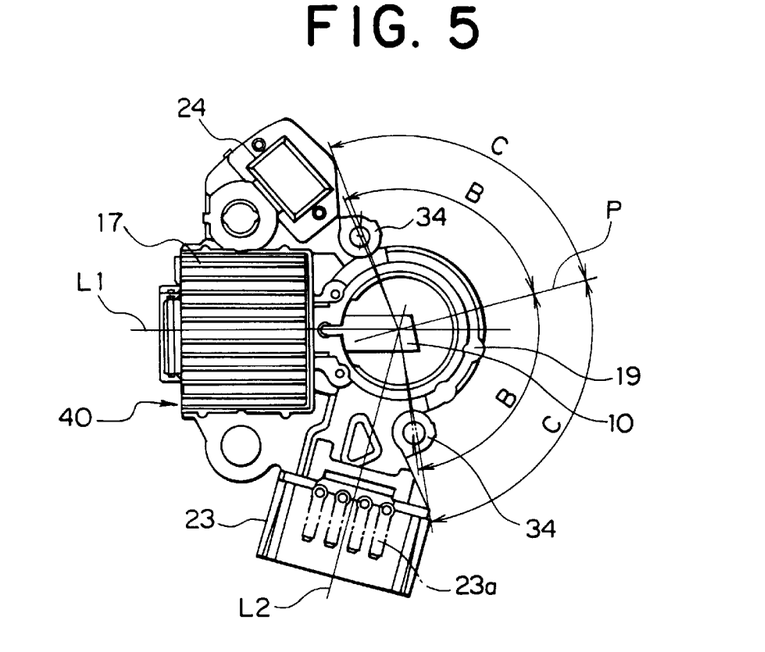
FIG. 5 is a rear elevation showing a voltage regulator case fitted with a voltage regulator in an automotive alternator according to Embodiment 2 of the present invention.

As shown in FIG. 5, in Embodiment 2, the end surfaces of both ends of the voltage regulator case 40 in the circumferential direction are shaped symmetrically about a line P which passes through the axial center and divides the case 40 in half in the circumferential direction.

The rest of the construction is the same as for Embodiment 1.

In Embodiment 2, the shape of the ends of the condenser housing portion 24 and the connector portion 23 in the circumferential direction and the centers of the bores in the connecting terminals 34 are shaped symmetrically about a line P which passes through the axial center and divides the voltage regulator case 40 in half in the circumferential direction.

Figure 6:
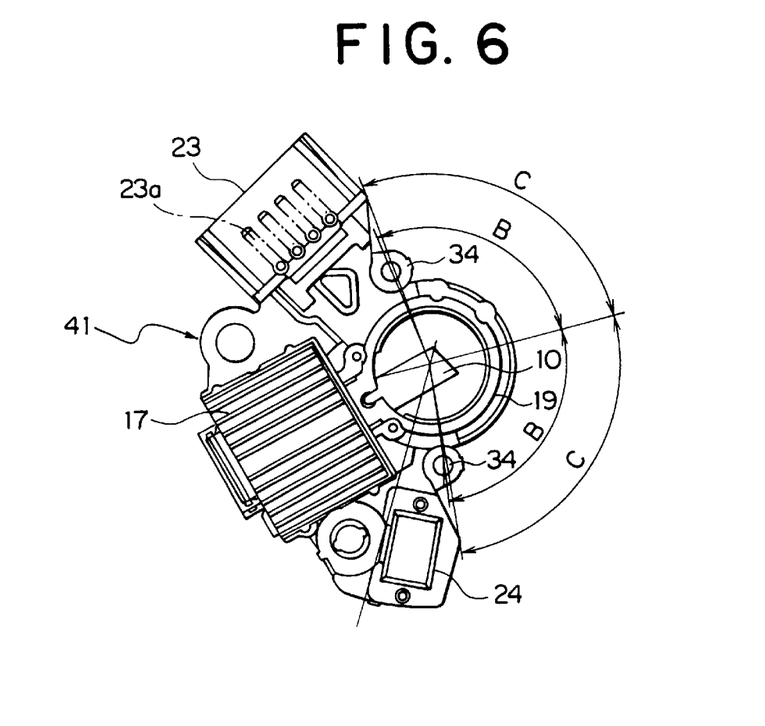
FIG. 6 is a rear elevation showing another voltage regulator case fitted with the voltage regulator in the automotive alternator according to Embodiment 2 of the present invention.
Figure 7:
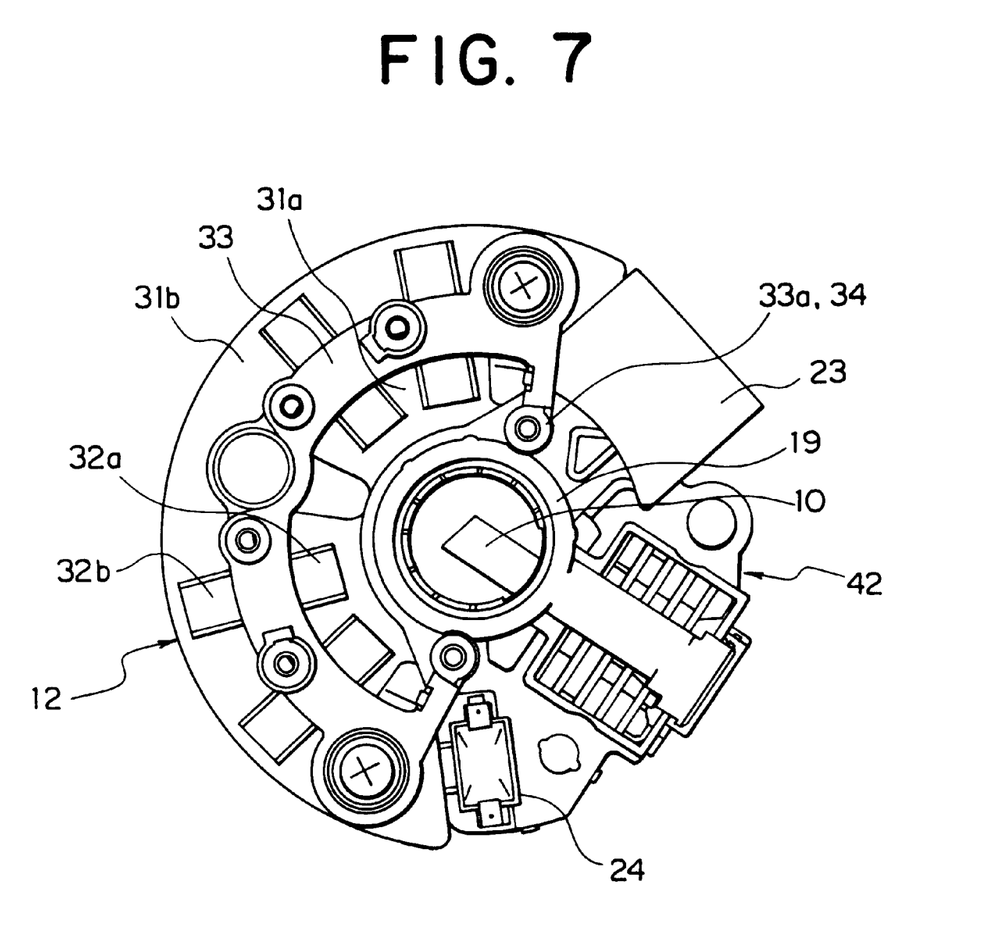
FIG. 7 is a front elevation showing the positional relationship between a voltage regulator case and a rectifier in another automotive alternator according to Embodiment 2 of the present invention.

Thus, in the voltage regulator case 41 shown in FIG. 6 in which the condenser housing portion 24 and the connector portion 23 have a different positional relationship, the shape of the ends of the condenser housing portion 24 and the connector portion 23 in the circumferential direction and the centers of the bores in the connecting terminals 34 coincides with the shape of the ends of the condenser housing portion 24 and the connector portion 23 in the circumferential direction and the centers of the bores in the connecting terminals 34 of the voltage regulator case 40 shown in FIG. 5. Thus, as shown in FIGS. 4 and 7, the ends of the voltage regulator cases 40, 41 in the circumferential direction can be fitted with and accommodate both ends of the same rectifier 12 in the circumferential direction.

Consequently, it is possible to match the same rectifier 12 with different voltage regulator cases 40, 41, reducing the number of parts.

The present invention is constructed in the above manner and exhibits the effects described below.

According to one aspect of the present invention, there is provided an automotive alternator comprising a shaft supported in a case so as to be able to rotate freely; a rotor disposed in the case and composed of a pair of pole cores each having a plurality of claw portions projecting from outer circumferential edge portions thereof, the pole cores being fixedly fitted over the shaft in an opposed relation to each other so that the claw portions are able to engaged with each other; a stator disposed within the case so as to be positioned around the periphery of the rotor; centrifugal fans secured to both axial ends of the rotor; a rectifier for rectifying an alternating current generated in the stator to a direct current, the rectifier being mounted within the case coaxial to the shaft at one end of the shaft and on a plane which intersects the axial center of the shaft at a right angle; a voltage regulator for regulating an output voltage of the stator; and a voltage regulator case molded from insulating resin in which a connector portion, a circuit housing portion for housing a circuit portion of the voltage regulator and a condenser housing portion are integrally formed, in which conductors are insert-molded to form connecting terminals for electric connection to the outside and internal wiring paths, and on which a heat sink for cooling the circuit portion of the voltage regulator is disposed so as to cover an opening of the circuit housing portion, the voltage regulator case being disposed on the same plane as the rectifier so as to surround the shaft at one end of the shaft, wherein the connector portion, the circuit housing portion and the condenser housing portion of the voltage regulator case are arranged circumferentially such that the axial direction of the connector portion, the longitudinal direction of cooling fins of the heat sink and the longitudinal direction of the condenser housing portion each point towards the axial center of the shaft. Thus, it is possible to provide an automotive alternator which is capable of effectively cooling the voltage regulator as wind resistance to the cooling air which flows along the surface of the cooling fins of the heat sink for cooling the circuit portion of the voltage regulator is reduced, is capable of effectively cooling diodes as the circumferential angle of the voltage regulator case is reduced and the circumferential angle of the rectifier can be made that much larger, and is capable of improving mountability onto the automobile as the corner portions of the connector portion of the voltage regulator case are housed within the outermost diameter of the centrifugal fans and therefore the case around the outside of the outermost diameter of the centrifugal fans can be formed in a circular shape.

In addition, since the end surfaces of both ends of the voltage regulator case in the circumferential direction are shaped symmetrically about a line P which passes through the axial center of the shaft and divides the voltage regulator case in half in the circumferential direction, the arrangement of the connector portion is reversed without having to modify the shape of the rectifier.

In addition, since the circumferential angle of the voltage regulator case centered on the axial center of the shaft is less than 180 degrees, the circumferential angle of the rectifier is increased. Thus, the surface area of the heat sink is expanded and a large spacing can be adopted between the diodes, enabling effective cooling of the diodes.

What is claimed is:

1. An automotive alternator comprising:

a shaft supported in a case so as to be able to rotate freely;

a rotor disposed in said case and composed of a pair of pole cores each having a plurality of claw portions projecting from outer circumferential edge portions thereof, said pole cores being fixedly fitted over said shaft in an opposed relation to each other so that said claw portions are able to engaged with each other;

a stator disposed within said case so as to be positioned around the periphery of said rotor;

centrifugal fans secured to both axial ends of said rotor;

a rectifier for rectifying an alternating current generated in said stator to a direct current, said rectifier being mounted within said case coaxial to said shaft at one end of said shaft and on a plane which intersects the axial center of said shaft at a right angle;

a voltage regulator for regulating an output voltage of said stator; and a voltage regulator case molded from insulating resin in which a connector portion, a circuit housing portion for housing a circuit portion of said voltage regulator and a condenser housing portion are integrally formed, wherein conductors are insert-molded to form connecting terminals for electric connection to the outside and internal wiring paths, and a heat sink for cooling said circuit portion of said voltage regulator is disposed so as to cover an opening of said circuit housing portion, said voltage regulator case being disposed on the same plane as said rectifier so as to surround said shaft at one end of said shaft, wherein said connector portion, said circuit housing portion and said condenser housing portion of said voltage regulator case are arranged circumferentially such that the axial direction of said connector portion, the longitudinal direction of cooling fins of said heat sink and the longitudinal direction of said condenser housing portion each point towards the axial center of said shaft.

2. The automotive alternator according to claim 1, wherein end surfaces of both ends of said voltage regulator case in a circumferential direction are shaped symmetrically about a line P which passes through the axial center of said shaft and divides said voltage regulator case in half in the circumferential direction.

3. The automotive alternator according to claim 1, wherein a circumferential angle of said voltage regulator case centered on the axial center of said shaft is less than 180 degrees.

* * * * *